US006848309B2

(12) United States Patent
Sakai

(10) Patent No.: US 6,848,309 B2
(45) Date of Patent: Feb. 1, 2005

(54) CAPACITIVE TYPE DYNAMIC QUANTITY SENSOR

(75) Inventor: Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/291,420

(22) Filed: Nov. 12, 2002

(65) Prior Publication Data

US 2003/0154789 A1 Aug. 21, 2003

(30) Foreign Application Priority Data

Feb. 19, 2002 (JP) ........................................ 2002-041503

(51) Int. Cl.[7] ........................................... G01P 15/125
(52) U.S. Cl. ................... 73/514.32; 361/280
(58) Field of Search ...................... 73/514.32, 514.18, 73/504.12, 504.14, 862.626; 361/280, 283.3

(56) References Cited

U.S. PATENT DOCUMENTS

| 6,151,966 | A | | 11/2000 | Sakai et al. ............... 73/514.32 |
| 6,170,332 | B1 | * | 1/2001 | MacDonald et al. ...... 73/514.32 |
| 6,282,960 | B1 | * | 9/2001 | Samuels et al. .......... 73/514.32 |
| 6,318,177 | B2 | | 11/2001 | Buchan et al. ........... 73/514.32 |

* cited by examiner

Primary Examiner—John E. Chapman
(74) Attorney, Agent, or Firm—Posz & Bethards, PLC

(57) ABSTRACT

In a capacitive type dynamic quantity sensor, a width of a beam in a beam portion extending in a direction that is perpendicular to a predetermined deformation direction and a gap disposed between a movable electrode and the fixed electrode in the predetermined deformation direction are approximately identical. Accordingly, manufacturing error is prevented from affecting the sensitivity of the capacitive type dynamic quantity sensor. For example, a manufacturing tolerance error of ±2.5% is allowed as a result of designing the width of the beam and the gap to be identical in length.

12 Claims, 6 Drawing Sheets

CAPACITIVE TYPE DYNAMIC QUANTITY SENSOR

CROSS REFERENCE TO RELATED APPLICATION

This application is based upon and claims the benefit of Japanese Patent Application No. 2002-41503 filed on Feb. 19, 2002, the contents of which are incorporated herein by reference.

FIELD OF THE INVENTION

The present invention relates generally to dynamic quantity sensors, and specifically to a capacitive type dynamic quantity sensor that detects a dynamic quantity using a capacitance formed between a movable electrode and a fixed electrode.

BACKGROUND OF THE INVENTION

Conventionally, a capacitive type dynamic quantity sensor such as the one shown in FIG. 7 is typically constructed by etching a substrate 10 such as a semiconductor substrate. The etching forms a trench in the substrate 10 to separate a movable portion including beam portions 22 and movable electrodes 24 from electrodes of fixed electrode groups 32, 42.

The beam portions 22 extend in a direction perpendicular to the Y direction in FIG. 7 and are spring-like in operation, as they deform in the Y direction with respect to a force applied thereon. The movable electrodes 24 also extend in a direction that is perpendicular to the Y direction and move in the Y direction along with the beam portions 22. The movable electrodes 24 have, for example, a comb-shaped configuration.

The comb-shaped electrodes of the fixed electrode groups 32, 42 are supported by and fixed on the substrate 10 to respectively face the movable electrodes 24.

According to the above described capacitive type dynamic quantity sensor, a total capacitance CS1 is formed in gaps D disposed between the movable electrodes 24 on the left side in FIG. 7 and the electrodes of the fixed electrode group 32, and a total capacitance CS2 is formed in gaps D disposed between the movable electrodes 24 on the right side in FIG. 7 and the electrodes of the fixed electrode groups 42. When a physical quantity such as acceleration is applied to the capacitive type dynamic quantity sensor, the capacitances CS1, CS2 vary with respect to an amount of the physical quantity. Therefore, the physical quantity is detected based on the variation of difference between the capacitances CS1, CS2.

In the above capacitive type dynamic quantity sensor, the fixed electrode groups 32, 42 and the movable portion including the beam portions 22 and the movable electrodes 24 are formed at the same time by etching the trench in the substrate 10. Therefore, a manufacturing error of width B is approximately the same relative to each of the beam portions 22 and the gaps D disposed between the movable electrodes 24 and the electrodes of the fixed electrode groups 32, 42. For example, as the widths B of the beam portions 22 increase in width, the gaps D disposed between the movable electrodes 24 and the electrodes of the fixed electrode groups 32, 42 decrease in width.

Accordingly, the manufacturing error causes variations of the widths B and the gaps D, and therefore characteristic non-uniformity of the capacitive type dynamic quantity sensor becomes large.

Incidentally, the characteristic non-uniformity of the capacitive type dynamic quantity sensor can be minimized by enlarging the widths B and the gaps D. However, the capacitances CS1, CS2 consequently decrease and sensor sensitivity also decreases.

SUMMARY OF THE INVENTION

It is therefore an object of the present invention to provide a physical quantity sensor that is capable of obviating the above problem.

It is another object of the present invention to provide a physical quantity sensor that is capable of good sensitivity.

According to a capacitive type dynamic quantity sensor of the present invention, a width of a beam of a beam portion extending in a perpendicular direction relative to a predetermined deformation direction and a gap disposed between a movable electrode and a fixed electrode in the predetermined deformation direction are approximately identical.

Accordingly, the sensitivity of the capacitive type dynamic quantity sensor is not affected. For example, a manufacturing tolerance of ±2.5% in designing the width of the beam and the gap between the movable electrode and the fixed electrode is allowed.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

Figure 1:
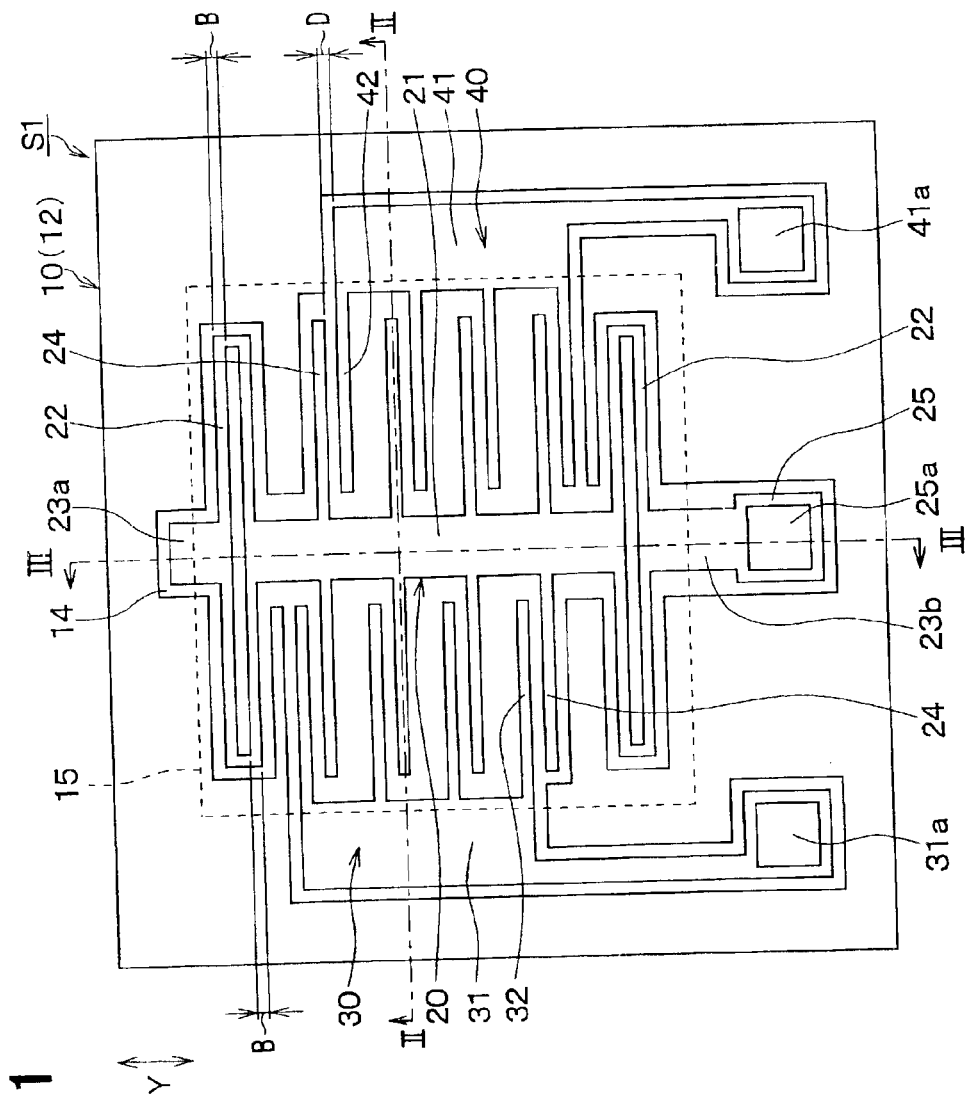
FIG. 1 shows a plan view of a capacitive type dynamic quantity sensor according to a first embodiment of the present invention.

The present invention will be described further with reference to various embodiments shown in the drawings.

(First Embodiment)

In the present embodiment, a differential capacitance type semiconductor acceleration sensor (acceleration sensor) S1, or, more generally, a capacitive type dynamic quantity sensor is shown.

Figure 2:
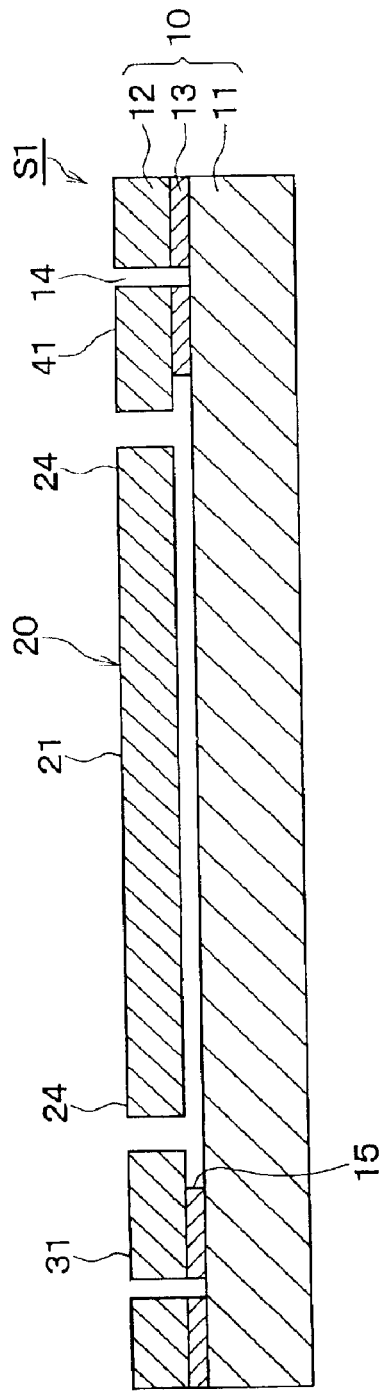
FIG. 2 shows a cross sectional view of the capacitive type dynamic quantity sensor taken along line II—II of FIG. 1.
Figure 3:
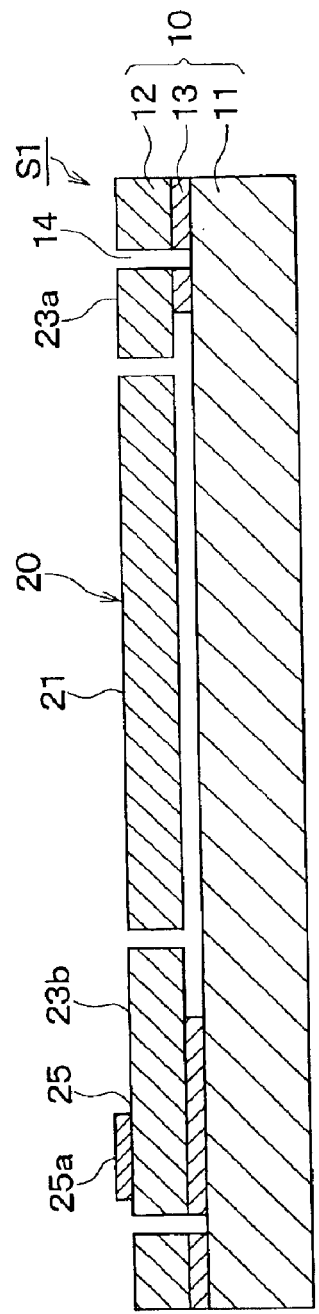
FIG. 3 shows a cross sectional view of the capacitive type dynamic quantity sensor taken along line III—III of FIG. 1.

FIG. 1 shows a plan view of the acceleration sensor S1. FIGS. 2 and 3 show cross sectional views of the acceleration sensor S1 taken along lines II—II and III—III of FIG. 1. The acceleration sensor S1 is, for example, utilized as a vehicle acceleration sensor or a gyro sensor for controlling an airbag system, an Antilock Brake System (ABS), a side skid control system or in any other like system that requires sensing of a dynamic quantity.

The acceleration sensor S1 is manufactured on a semiconductor substrate using micro-machine technology. Referring to FIGS. 2 and 3, an SOI substrate 10 is used for the semiconductor substrate. The SOI substrate 10 includes a first silicon substrate 11, a second silicon substrate 12 and an oxide film 13 interposed between the first and second silicon substrates 11, 12. The first silicon substrate 11 corresponds to a first semiconductor layer, the second silicon substrate 12 corresponds to a second semiconductor layer, and the oxide film 13 corresponds to an isolation film.

Referring to FIGS. 1–3, the second substrate 12 has trenches 14 in which a configuration referred to collectively as a comb-shaped configuration of beams 20–40 including a movable portion 20 and fixed portions 30, 40 is formed. The oxide film 13 includes an opening portion 15 in which the comb-shaped configuration of beams 20–40 is formed.

The movable portion 20 supported across the opening portion 15 includes a rectangular plumb portion 21, beam portions 22 and anchor portions 23a, 23b. The rectangular plumb portion 21, the beam portions 22 and the anchor portions 23a, 23b are integrated with each other, and the anchor portion 23a, 23b support the plumb portion 21 via the beam portions 22. As shown in FIG. 3, the anchor portions 23a, 23b are formed at peripheral positions of the opening portion 15 of the oxide film 13 and are supported by first silicon substrate 11. Therefore, the beam portions 22 and the plumb portion 21 are disposed above the opening portion 15.

Each of the beam portions 22 has two beams, both of which extend in a parallel direction and join with each other at end portions thereof. Accordingly, the beam portions 22 form a rectangular frame and deform in a direction perpendicular to a longitudinal side of the beams. Specifically, according to the beam portions 22, the plumb portion 21 moves in a Y direction (arrow direction in FIG. 1) when acceleration including a Y direction component is applied thereto, and returns to an initial position thereof when the acceleration decreases. That is, the movable portion 20 moves in a deformation direction (i.e., the Y direction) of the beam portions 22 above the opening portion 15 upon application of acceleration.

The movable portion 20 also includes movable electrode groups 24 that extend in a direction perpendicular to the Y direction from both sides of the plumb portion 21. In FIG. 1, each side of the movable electrode groups 24 include four electrodes that protrude from right and left sides of the plumb portion 21, respectively, and respective electrodes of the movable electrode groups 24 are positioned above the opening portion. Accordingly, the movable electrode groups 24 are integrated with the beam portions 22 and the plumb portion 21 and therefore move in the Y direction with the beam portions 22 and the plumb portion 21.

The fixed portions 30, 40 are supported on respective opposing peripheral sides of the opening portion 15 of the oxide film 10, where the respective opposing peripheral sides are opposite the sides supporting the anchor portions 23a, 23b. The fixed portions 30, 40 include a first fixed portion 30 on a left side of FIG. 1 and a second fixed portion 40 on right side thereof.

The fixed portions 30, 40 include respective wiring portions 31, 41 and a plurality of respective first and second fixed electrode groups 32, 42. The wiring portions 31, 41 are fixed on the first silicon substrate 11 at the peripheral portion of the opening portion 15 of the oxide film 10. In FIG. 1, each of the fixed electrode groups 32, 42 is formed by four electrodes. Respective electrodes of the fixed electrode groups 32, 42 are supported on the wiring portions 31, 41 at end portions thereof and extend in parallel with, and oppose, respective electrodes of the movable electrode groups 24 so as to define respective predetermined gaps D therebetween. Hereinafter, the fixed electrode group 32 of the first fixed portion 30 will be referred to as a first fixed electrode group 32, and the fixed electrode group 42 of the second fixed portion 40 will be referred to as a second fixed electrode group 42.

Fixed electrode pads 31a, 41a for wire bonding are formed at predetermined positions of the wiring portions 31, 41 of the first and second fixed portions 30, 40. A movable electrode wiring portion 25 is formed on the anchor 23b and has a movable electrode pad 25a at a predetermined position thereof. The pads 25a, 31a, 41a are, for example, made of aluminum.

The acceleration sensor S1 is mounted on a package (not shown) at a reverse side of the first silicon substrate 11 corresponding to a side opposite the oxide film 13 via adhesive. An electrical detection circuit 100 (FIG. 4) is included in the package and is electrically connected to the electrode pads 25a, 31a, 41a via wiring such as gold, aluminum or the like.

Manufacture of the acceleration sensor S1 will now be described. A mask (not shown) corresponding to a shape of the comb-shaped configuration of beams 20–40 is formed on the second silicon substrate 12 of the SOI substrate 10 by photolithography. The trenches 14 are formed on the second substrate 12 by dry etching with $CF_4$, $F_6$ or the like. Accordingly, the comb-shaped configuration of beams 20–40 is formed on the SOI substrate 10. The oxide film 13 is then removed by sacrifice-etching with hydrofluoric acid or the like. Therefore, the comb-shaped configuration of beams 20–40 is supported by the first silicon substrate 11.

According to the acceleration sensor S1, a total capacitance CS1 is formed in gaps D defined in the Y direction between each of the movable electrodes 24 and corresponding ones of the fixed electrode group 32, and a total capacitance CS2 is formed in gaps D defined in the Y direction between each of the movable electrodes 24 and corresponding ones of the fixed electrode group 42. When a physical quantity such as acceleration is applied to the capacitive type dynamic quantity sensor, the capacitances CS1, CS2 vary with respect to an amount of the physical quantity. Therefore, the physical quantity is detected based on the variation between the capacitances CS1, CS2.

Figure 4:
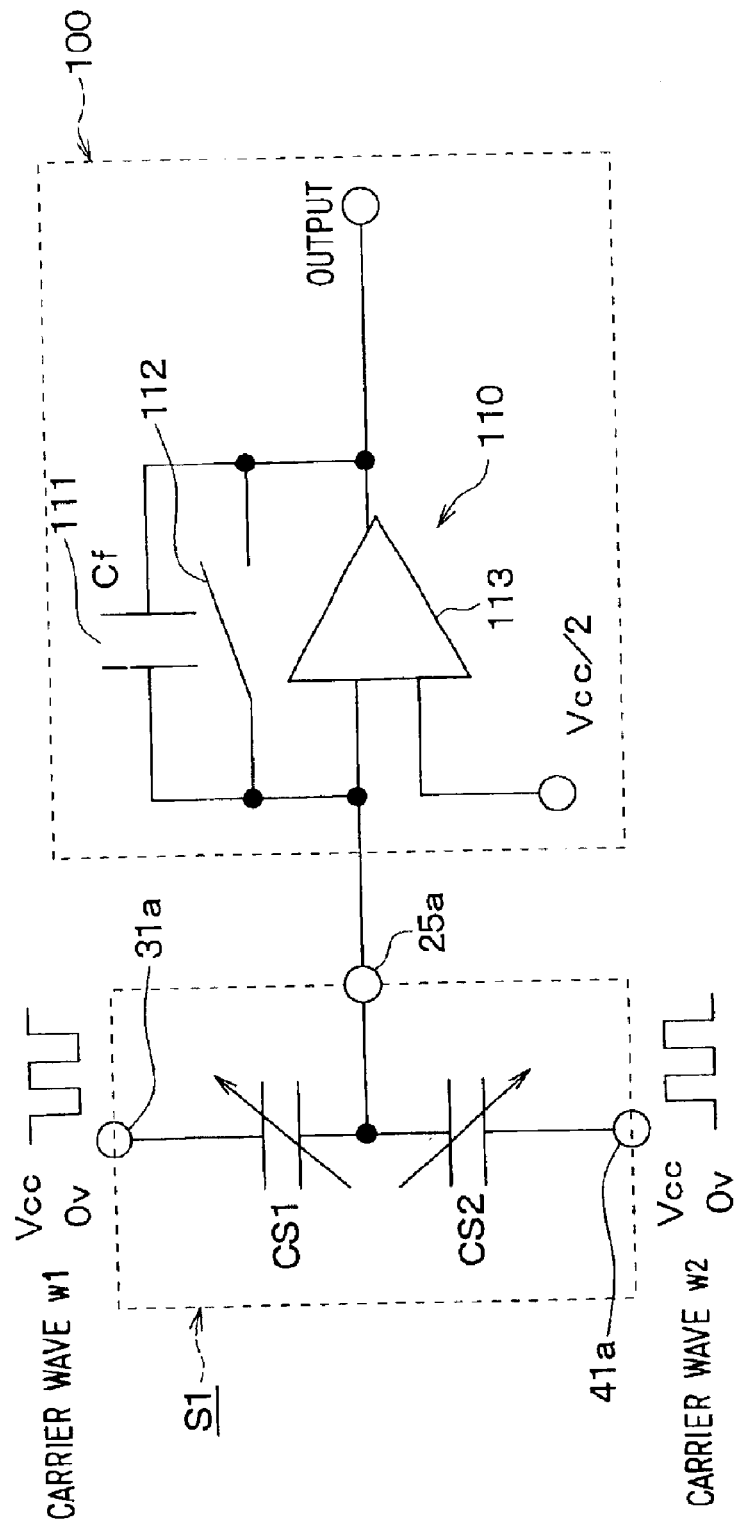
FIG. 4 shows an electrical circuit of the capacitive type dynamic quantity sensor according to the first embodiment.

FIG. 4 shows a schematic diagram of a detection electrical circuit 100 of the present acceleration sensor S1. The detection electrical circuit 100 includes a switched capacitor circuit (SC circuit) 110 having a capacitor 111 with a capacitance Cf, a switch 112 and a differential amplifier circuit 113. The SC circuit 110 converts an input capacitance difference (CS1−CS2) between the capacitances CS1, CS2 to a voltage.

According to the present acceleration sensor S1, for example, a carrier wave W1 with an amplitude Vcc is applied to the fixed electrode pad 31a, and a carrier wave W2 with an amplitude Vcc that is inverted with respect to the carrier wave W1 is applied to the fixed electrode pad 41a. The switch 112 of the SC circuit 110 is opened and closed based on a predetermined timing. Therefore, an acceleration applied to the acceleration sensor S1 is represented as an output voltage V0 according to the following formula:

$$V0 = (CS1 - CS2) \cdot Vcc / Cf \qquad (1)$$

Further, in the present acceleration sensor S1, the gaps D defined between each of the movable electrodes 24 and corresponding ones of the fixed electrodes 32, 42 are defined as having the same width as the widths B of the beam portions 22, with the widths B also being defined in the Y direction. Accordingly, it is possible to prevent the acceleration sensor from having decreased sensor characteristics due to manufacturing error without the need to enlarge the widths D, and therefore decrease the sensitivity of the acceleration sensor S1.

Generally, in a capacitive type dynamic quantity sensor, sensitivity varies linearly with capacitance. The variation of the capacitance corresponding to "ΔC" is expressed as follows, where a total capacitance formed between the movable electrodes 24 and the electrodes of fixed electrode groups 32, 42 at which acceleration is zero corresponds to "Co", mass of the movable portion 20 corresponds to "m", and spring constant of the beam portions 22 corresponds to "k". Incidentally, "D" corresponds to the gaps D as discussed above.

$$\Delta C = (2 \cdot Co \cdot m)/(k \cdot D) \qquad (2)$$

The sensitivity, i.e., the variation ΔC of the capacitance, varies based on manufacturing error such as etching error in forming the trenches 14 and sacrificial-etching error in removing the oxide film 13. The manufacturing error is defined by two types of size non-uniformity, that is, size non-uniformity in a direction parallel to a plane surface of the SOI substrate 10 of the beam portions 22, the movable electrodes 24, and the electrodes of the fixed electrode groups 32, 42, and size non-uniformity in a direction parallel to the thickness of the SOI substrate 10. The former corresponds to width non-uniformity ΔD, and the latter corresponds to thickness non-uniformity Δh.

The sensitivity ΔC expressed in formula (2) varies as follows, where a thickness of the beam portions 22, the movable electrodes 24, and the electrodes of the fixed electrode groups 32, 42 corresponds to "h", and widths of the movable electrodes 24 and of the electrodes of the fixed electrode groups 32, 42 correspond to "W". Incidentally, "D" corresponds to the gaps D and "B" corresponds to the widths B as discussed above.

$$\Delta C \propto \frac{\frac{(h+\Delta h)}{(D-\Delta D)} \cdot (h+\Delta h) \cdot (W+\Delta D)}{(h+\Delta h) \cdot (B+\Delta D)^3 \cdot (D-\Delta D)} \qquad (3)$$

The formula (3) transforms through the following formulae, resulting finally in formula (6).

$$\Delta C \propto \frac{(h+\Delta h) \cdot (W+\Delta D)}{(B+\Delta D)^3 \cdot (D-\Delta D)^2} \qquad (4)$$

$$\Delta C \propto \frac{(h+\Delta h)}{(B+\Delta D)^2 \cdot (D-\Delta D)^2} \qquad (5)$$

$$\Delta C \propto \frac{(h+\Delta h)}{\{B \cdot D + (D-B) \cdot \Delta D - \Delta D^2\}^2} \qquad (6)$$

Referring to formula (6), the denominator has a minimum value when the widths B are equal in size to the gaps D.

Figure 5:
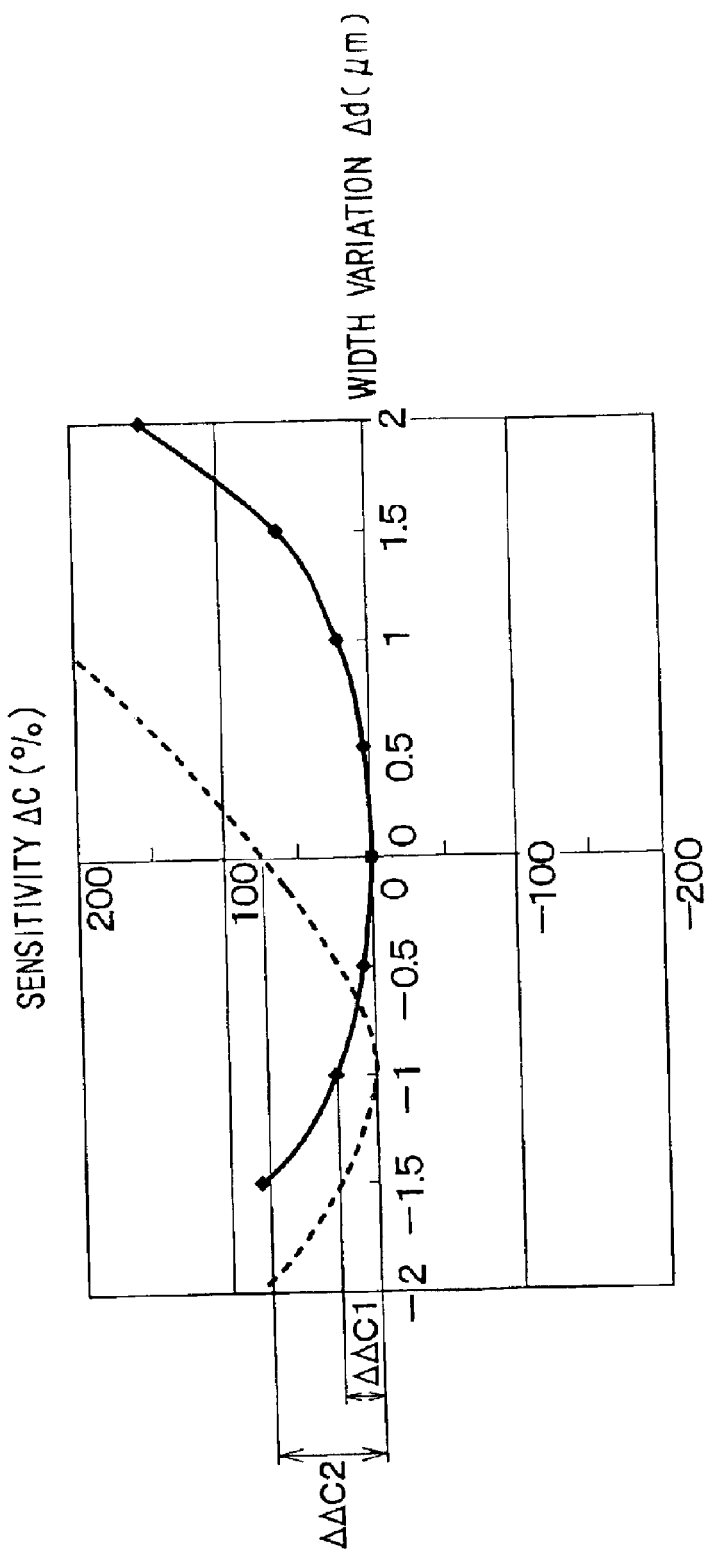
FIG. 5 shows a schematic view of a relationship between width variation ΔD and sensitivity ΔC according to the first embodiment of the present invention.

FIG. 5 shows a relationship between the width non-uniformity ΔD and the variation of the capacitance ΔC. In FIG. 5, a solid line represents the relationship when the widths B are equal in size to the gaps D, and a dotted line represents the relationship when the widths B are larger in size than the gaps D. An inflection point of a quadratic curve illustrated by the solid line is a point of ΔD=0, and that of a quadratic carve illustrated by the dotted line is shifted from the point of ΔD=0.

In a manufacturing process, the variation of the capacitance ΔC is shifted from the center point, that is, 0 μm. For example, if ΔD is shifted in a range from −1 μm to +1 μm, non-uniformity ΔΔC1 of the variation of the capacitance ΔC when the widths B equal the gaps D is smaller than non-uniformity ΔΔC2 of the variation of the capacitance ΔC when the widths B are larger than the gaps D.

Also, it has been shown that the relationship is identical if non-uniformity of the variation of the capacitance ΔC when the widths B equal the gaps D is compared with non-uniformity of the variation of the capacitance ΔC when the widths B are smaller than the gaps D. The variation of the capacitance ΔC has a minimum value when the widths B equal the gaps D and an inflection point of a quadratic curve representing the relationship between the width non-uniformity ΔD and the variation of the capacitance ΔC is a point of ΔD=0. Accordingly, by designing the acceleration sensor S1 to have identical widths B and gaps D, the sensitivity of the acceleration sensor S1 is not affected due to manufacturing error.

Therefore, in the present embodiment, the size of the widths B are the same as the gaps D. This effect is preferably obtained with the acceleration sensor S1 of which the beam portions 22, the movable electrodes 24 and the electrodes of the fixed electrode groups 32, 42 are simultaneously formed on the substrate 10 (the second substrate 12) by forming the trenches 14 with etching.

Incidentally, an error tolerance of ±2.5% is acceptable in designing the widths B and the gaps D. This is because a manufacturing error of ±2.5% may be generated when a mask pattern corresponding to the comb-shaped configuration of beams 20–40 is manufactured.

(Modification)

Figure 6B:
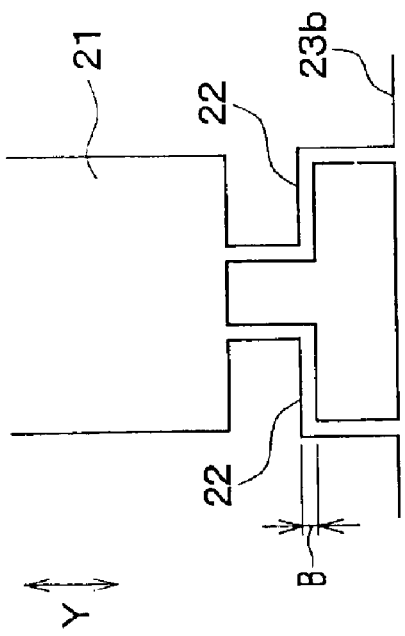
FIGS. 6A and 6B show beam portions according to a modified version of the first embodiment.
Figure 6A:
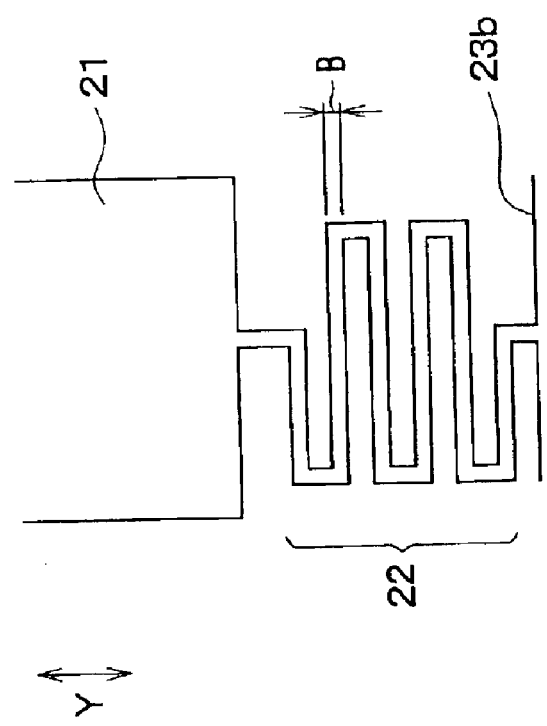
Figure 7:
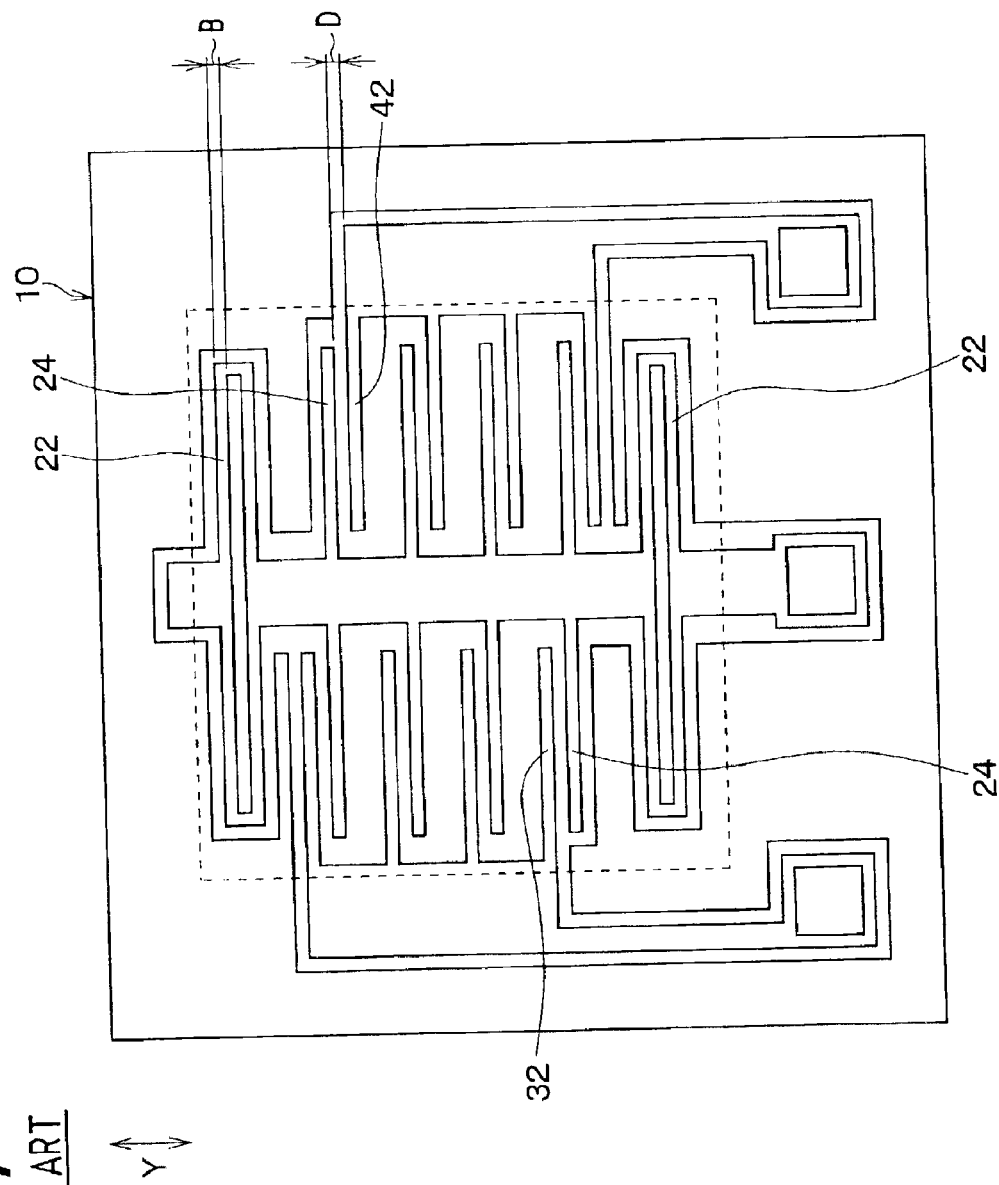
FIG. 7 shows a plan view of a capacitive type dynamic quantity sensor according to a related art capacitive type dynamic quantity sensor.

In the first embodiment, the beam portions 22 can alternatively be adapted as a repeatedly turned-shaped pattern illustrated in FIG. 6A, or as an L-shaped pattern illustrated in FIG. 6B. In these cases, widths B correspond to widths of beams extending in a direction that is perpendicular to the Y direction.

The opening portion 15 may alternatively be formed in the first silicon substrate 11 as well as in the oxide film 13. In this case, after the comb-shaped configuration of beams 20–40 is formed in the second silicon substrate 1, the first silicon substrate 11 is anisotropically etched and the oxide film 13 is further etched with hydrofluoric acid or the like.

In the above embodiments, an acceleration sensor is described; however, other capacitive type dynamic quantity sensors such as angular speed sensor may also be realized in a similar manner.

While the above description is of the preferred embodiments of the present invention, it should be appreciated that the invention may be modified, altered, or varied without deviating from the scope and fair meaning of the following claims.

What is claimed is:

1. A capacitive type dynamic quantity sensor comprising:
   a beam portion having a beam for deforming in a predetermined deformation direction based on physical force application;
   a movable electrode formed integrally with the beam portion to move therewith and extending in a direction perpendicular to the predetermined deformation direction; and
   a fixed electrode facing the movable electrode and being separated therefrom in the predetermined deformation direction by a predetermined gap;

wherein respective widths of the movable electrode, the fixed electrode and the gap are approximately identical, and the beam of the beam portion includes two beams each having a width that is approximately the same as the width of the gap.

2. The capacitive type dynamic quantity sensor of claim 1, wherein the two beams extend in a parallel direction with respect to one another and join with each other at end portions thereof.

3. The acceleration sensor of claim 2, wherein the be portions have a repeating turned-shaped pattern.

4. The acceleration sensor of claim 2, wherein the be portions have an L-shaped pattern.

5. The capacitive type dynamic quantity sensor of claim 1, wherein respective widths of the beam and the gap are defined so that one may differ from another with an error tolerance of approximately ±2.5%.

6. The capacitive type dynamic quantity sensor of claim 1, further comprising:

a plumb portion formed integrally with the movable electrode and the beam portion, wherein the movable electrode includes comb-shaped electrodes located at both sides of the plumb portion; and the fixed electrode includes comb-shaped first and second fixed electrodes extending in parallel with, and opposed to respective ones of the comb-shape electrodes of the movable electrode so as to define the predetermined gap therebetween.

7. An acceleration sensor comprising:

a semiconductor substrate including an opening portion;

fixed electrode groups supported on respective opposing peripheral sides of the opening portion and extending over the opening portion; and a movable portion supported on the semiconductor substrate across the opening portion and including a rectangular plumb portion, beam portions, movable electrode groups extending from the plumb portion and being in parallel with and opposing the fixed electrode groups to define respective gaps therebetween, and anchor portions supporting the plumb portion at respective ends of the plumb portion, wherein the movable electrode groups are movable in a deformation direction of the beam portions above the opening portion upon application of a dynamic force to the beam portions, and respective widths of the fixed electrode groups, the beam portions the gaps are approximately identical.

8. The acceleration sensor of claim 7, wherein each of the beam portions include two beams, both of which extend in parallel with one another and join with each other at end portions thereof, a width of each of the beams being approximately the same as the width of the gaps.

9. The acceleration sensor of claim 7, wherein widths of the beam portions and the gaps are defined so that one may differ from another with an error tolerance of approximately ±2.5%.

10. The acceleration sensor of claim 7, wherein each of the fixed electrode groups includes comb-shaped first and second fixed electrodes extending in parallel with, and opposed to, respective ones of the comb-shaped electrodes so that at least one of the comb-shaped first and second fixed electrodes, together with one of the comb-shaped electrodes of a corresponding one of the beam portions, defines one of the gaps.

11. The acceleration sensor of claim 7, wherein the beam portions have a repeating turned-shaped pattern.

12. The acceleration sensor of claim 7, wherein the beam portions have an L-shaped pattern.

* * * * *